United States Patent Office 3,530,296
Patented Sept. 22, 1970

3,530,296
METHOD FOR MEASURING QUANTITIES ASSOCIATED WITH THE FILLER DISTRIBUTION OF PAPER
Antti Ilmari Lehtinen, Jyvaskyla, and Eino Juhani Kuusi, Helsinki, Finland, assignors to Valmet Oy, Helsinki, Finland, a corporation of Finland
Filed Mar. 29, 1968, Ser. No. 717,350
Claims priority, application Finland, Apr. 1, 1967, 962/67
Int. Cl. G01t 1/16
U.S. Cl. 250—83       2 Claims

ABSTRACT OF THE DISCLOSURE

Coatings and fillers in paper are measured without destroying the paper by a radioisotope radiation source, alpha radiation being used for measuring the coating substance and the filler contents of the surface layers of paper, while X-ray, gamma or beta radiation is used for measuring the total filler contents in the direction of paper's thickness.

---

The invention concerns a method for non-destructive laboratory or on-line measurement of the filler distribution one-sidedness, total filler content and filler distribution of paper. The method according to the invention is based on X-ray fluorescence analysis of the filler components in the paper. By using, for exciting radiation, alpha particle radiation the one-sidedness of the filler distribution in the surface layers of the paper may be determined and by using photon or beta radiation which is more penetrating than alpha radiation, the total filler content and filler distribution of the paper.

When the paper to be examined is irradiated either in an on-lien method or in laboratory conditions with appropriate exciting radiation, the filler substance atoms of heavier atomic weight in the filler produce their own characteristic X-ray radiation. Information is thus obtained on the kind and amount of filler by measuring this characteristic radiation. For use as detector in these measurements a proportional counter is usually most suitable. Analysis of the radiation may be carried out by pulse height analysis or with balanced Ross filters, or with both. In certain cases even a Geiger tube can be used for detector.

Figure 1:
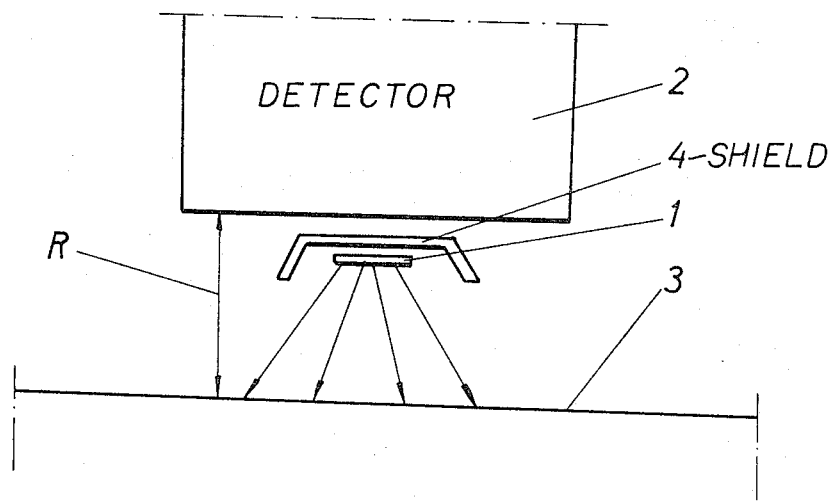
Figure 2:
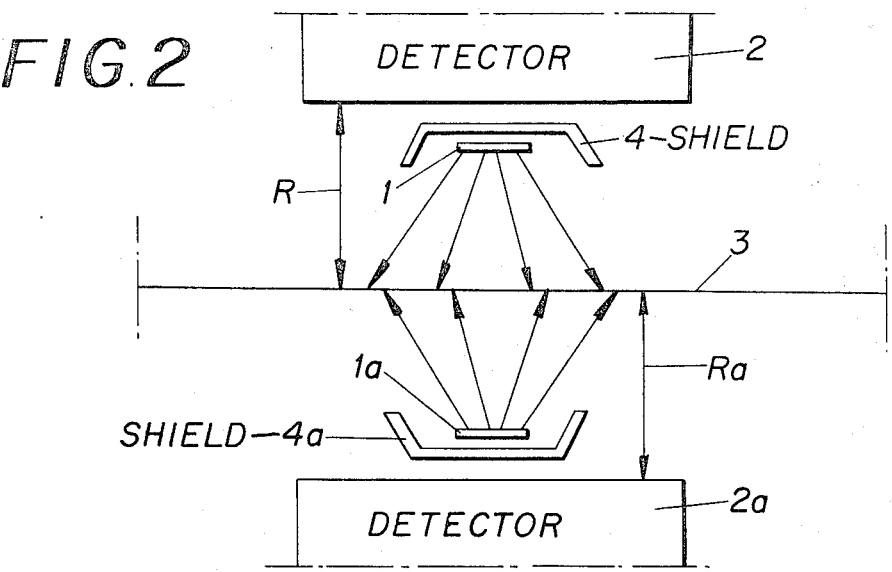

The invention is described in greater detail in the following in the scope of some embodiments, with reference to the attached drawing, FIG. 1 of which is a diagram showing one way in which the measuring arrangement may be mounted. FIG. 2 is a similar diagram showing the measuring of paper from both sides. The radiation source has been denoted with the reference numeral 1 in the figure, the detector with 2. The paper sample is located at the point indicated by 3. Between the radiation source and the detector there is a shield 4, which does not prevent all the characteristic radiation R from reaching the detector 2.

When the one-sidedness of the filler distribution in the paper is monitored, alpha radiation is employed, as was already said. The particles emitted by a suitable alpha source (e.g. $Po^{210}$) penetrate, after passing through appropriate absorbers, only into the superficial layer of the paper, where they excite characteristic X-ray radiation of the filler components. The one-sidedness of the filler distribution can be elicited by performing the test and the measurement on both sides of the paper. In that case, as shown in FIG. 2, the paper 3 is placed between two radiation sources 1 and 1a. There are two shields 4 and 4a and two detectors 2 and 2a. Depending on the absorbers between the alpha source ($Po^{210}$) and the paper, the maximum depth of penetration of the alpha particles, and thus the thickness of the layer from which information is obtained, varies within the limits of 0–2.5 mg./cm.$^2$.

In the measurement of the heaviest components, at which silicon or perhaps aluminum has to be considered the lower limit, air may be used between the specimen and the detector, whereby on-line measurement using enclosed detectors is feasible. The external conditions (length of the air path, humidity and density of the air) should then be very closely constant, particularly in connection with measurements of silicon and aluminum.

In laboratory measurements, paths through air between the source, specimen and detector can be avoided, and even analysis for lighter components is then more easily accomplished.

Particular attention has to be paid to safety considerations in the design and use of the alpha source to be used in on-line measurements.

An idea is obtained of the total filler content of the paper by using, for exciting radiation, photon or beta radiation of greater penetrability than alpha radiation. Depending on the component which constitutes the object of analysis, the radiation source may be e.g. a $H^3$-Ti, $H^3$-Zr or $Fe^{55}$ source. Owing to the greater penetration depth of the exciting radiation, the results of the measurement of the filler components' characteristic radiation now furnish information on a more extensive paper layer—in association with the heaviest components on the paper as a whole (100–50 g./m.$^2$). As a result of the absorption of the excited radiation in the paper itself higher characteristic radiation intensity is obtained in this case, too, from the part of the paper facing the radiation source and detector, and it is accordingly indicated to perform the measurements from both sides of the paper also in this instance.

By combining the results obtained in this manner with those measured with alpha radiation on the total filler content of the paper can be determined with comparatively good accuracy and the shape of the total filler content distribution can be inferred.

With the aid of a method according to the invention the filler content of the surface layer of the paper, and thus the one-sidedness of the filler distribution, may be determined with regard to most filler components by on-line measurements or by non-destructive laboratory measurements. Moreover, the total filler content of the paper and its distribution can be determined with relatively good accuracy. The equipment involved in the measurements is simple, and the on-line measurements interfere in no way with the process.

We claim:

1. A method for the non-destructive measurement of the contents of various coating substances and fillers in the surface layers of paper and of the total filler contents of paper and of their distributions in the direction of the thickness of the paper, by exciting in the coating substance and in the filler contents of the paper their characteristic X-ray fluorescence radiation and then measuring said radiation, said method being characterized in that a radioisotope radiation source is used for the excitation of said fluorescence radiation, that alpha radiation emitted by the radioisotope radiation source is used for measuring the coating substance and filler contents of the surface layers of the paper, and that radiation selected from the group consisting of X-ray, gamma and beta radiation and emitted by the radioisotope radiation source is used for measuring the total filler contents of paper in the direction of the thickness of the paper, said radioisotope radiation source being used along with a radiation detector, both the radioisotope radiation source and the radiation detector being located on the same side of the paper.

2. Method in accordance with claim 1, wherein the paper is measured on both sides by radioisotope radiation sources and radiation detectors located on both sides of the paper.

References Cited

UNITED STATES PATENTS

| | | | |
|---|---|---|---|
| 2,963,585 | 12/1960 | Beeh | 250—83.3 |
| 2,977,478 | 3/1961 | Wuppermann | 250—83.3 |
| 3,056,027 | 9/1962 | Martinelli | 250—83.3 |
| 3,121,166 | 2/1964 | Vossberg | 250—83.3 |
| 3,254,211 | 5/1966 | Black | 250—83.3 X |
| 3,383,510 | 5/1968 | Sellers. | |

RALPH G. NILSON, Primary Examiner

D. L. WILLIS, Assistant Examiner

U.S. Cl. X.R.

250—83.3